March 29, 1966 B. S. FRASSETTO 3,243,062
PALLET TRANSFER TRAILERS
Filed March 20, 1964 3 Sheets-Sheet 2
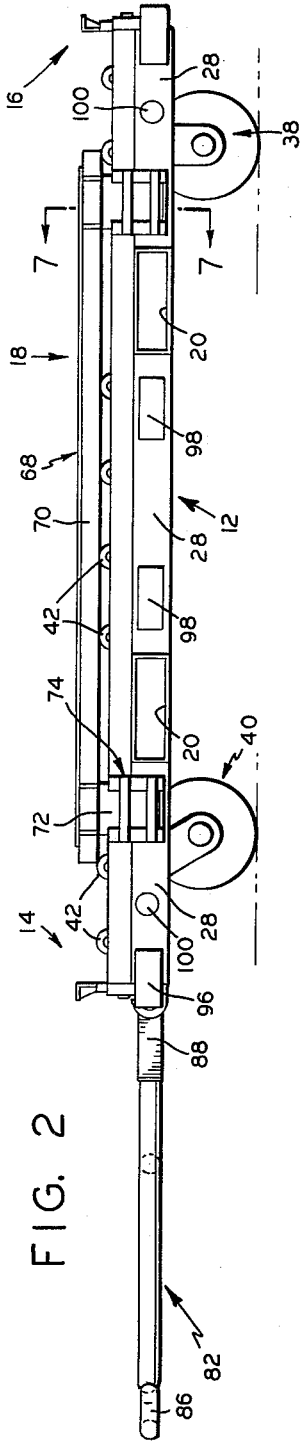
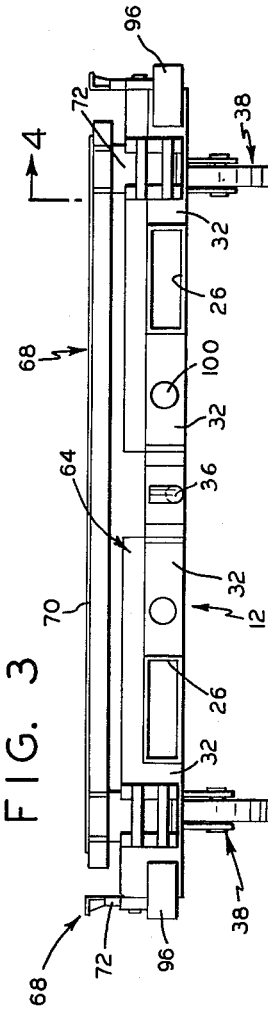
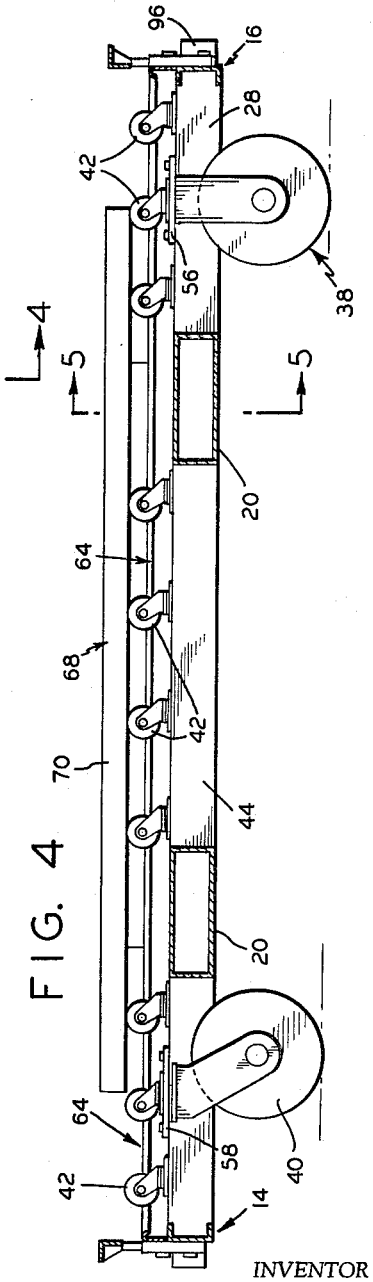
INVENTOR
BRUNO S FRASSETTO
BY D. M. Mezzapelle
ATTORNEY

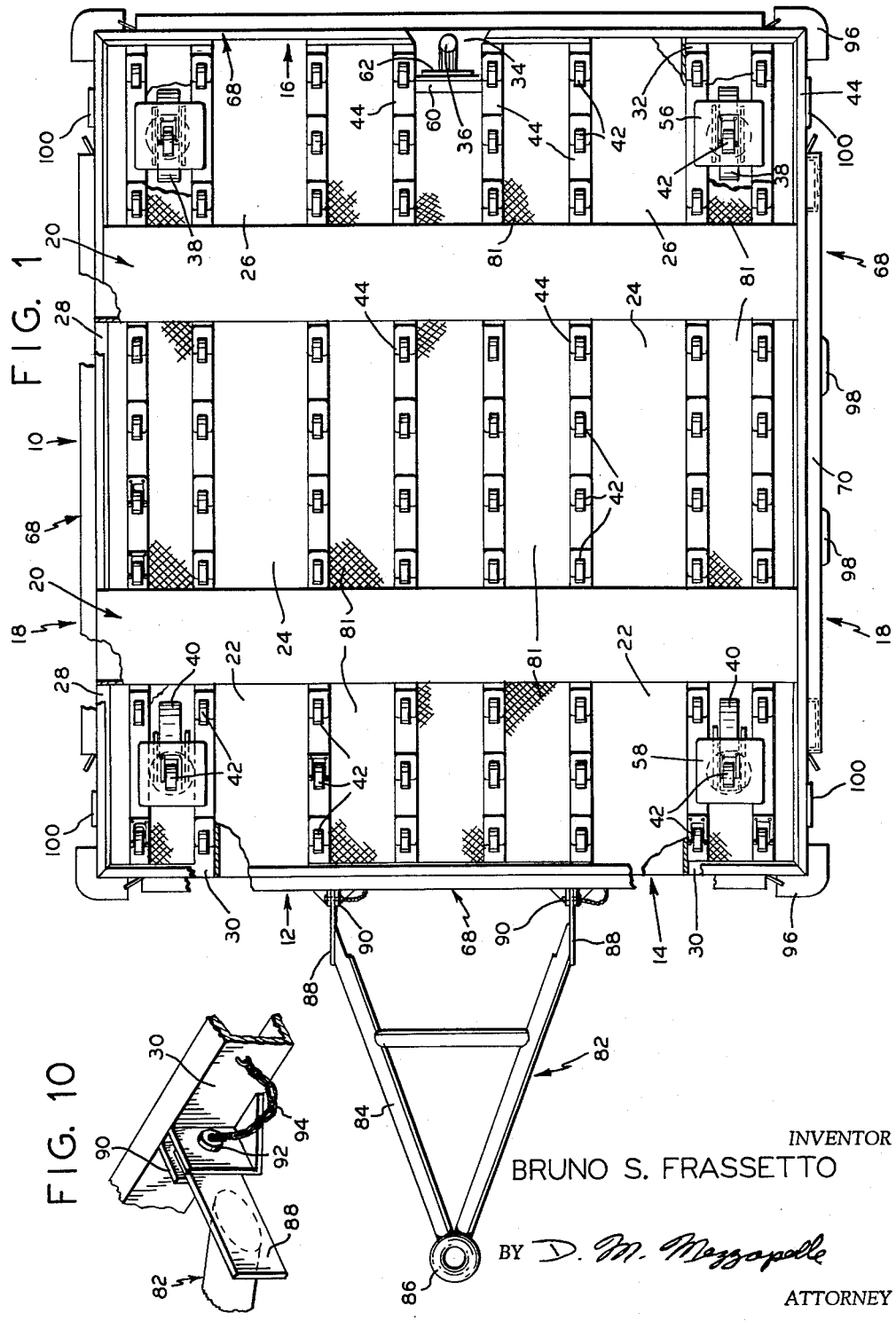

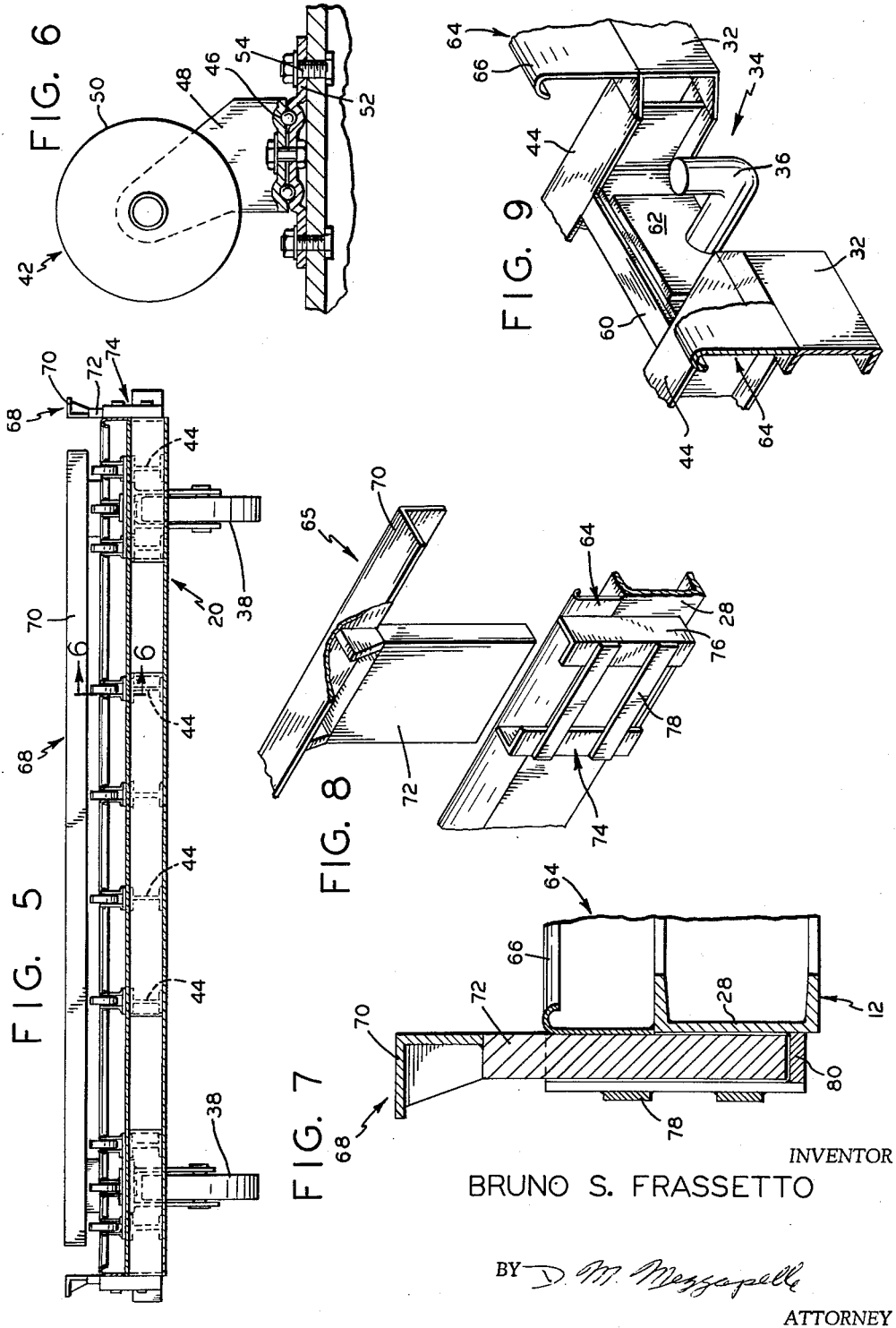

United States Patent Office 3,243,062
Patented Mar. 29, 1966

3,243,062
PALLET TRANSFER TRAILERS
Bruno S. Frassetto, Westport, Conn., assignor to Dorr-Oliver Incorporated, Stamford, Conn., a corporation of Delaware
Filed Mar. 20, 1964, Ser. No. 353,346
7 Claims. (Cl. 214—84)

This invention relates generally to improvements in wheeled structures and is directed particularly to pallet trailers.

In commercial and military air cargo operations, heavy cargoes are commonly supported and carried on pallets which are directly handled, with the cargo thereon, by conventional fork-lift, the palletized load being elevated for movement onto a cargo plane or lowered therefrom onto another carrier and then moved at ground level to a desired destination. Such cargoes commonly run to thousands of pounds in weight. Therefore, the transfer of such palletized loads, which may necessitate turning or shifting the load horizontally, involves time and the expenditure of considerable manual effort.

It is an object of the present invention in view of the foregoing to provide a novel trailer onto which a palletized load may be conveniently placed and which in turn may be elevated by a fork-lift vehicle. The trailer is provided with an omni-directional transfer surface to permit manual ground level and elevated pallet transfer operations.

Another object of the invention is to provide a novel pallet trailer designed to allow easy fore and aft, right to left and spin (360° turn) movements of the loaded or unloaded pallet.

A still further object of the invention is to provide a novel pallet trailer constructed to facilitate placement thereon and removal therefrom of a pallet, either loaded or unloaded, by a conventional fork-lift vehicle without damage to the pallet or trailer by the fork-lift tines.

Still another object of the invention is to provide a novel pallet trailer having a means for fork-lift operation whereby the trailer can be raised by a fork-lift for a cargo loading or unloading operation with respect to a cargo door such as that of an airplane or the like.

Still another object of the invention is to provide a pallet trailer of high constructional rigidity adequate to perform the dual functions of supporting a loaded pallet during ground level operations such as towing, ground level transfers, and stacking as well as elevated operations when the load is reacted through the trailer structure to the tines of a fork-lift vehicle.

A still further object of the invention is to provide a pallet trailer designed to have maximum ground clearance commensurate with low overall height to assure facile operation in uneven, rutted, icy, or snow covered terrain.

The invention broadly contemplates the provision, for the attainment of the above stated objectives, of a rigid frame structure, preferably of quadrangular form or outline mounted upon supporting casters at least two of which are fixed to the structure in the rear end portion thereof for straight fore and aft operation, with two others supporting the forward end of the structure for turning or rotation on both vertical and horizontal axes.

Within the quadrangle of the frame structure are fixed longitudinal and transverse tubular beams which open at their ends through adjacent side and end members of the frame and provide entry ways for lift fork tines.

Supported between the tubular longitudinal and transverse beams and the sides and ends of the frame is an assemblage of inverted casters arranged in a suitable pattern and having the topmost portions of the wheels or rollers thereof lying in a common plane to assure proper contact thereof with the underside of a pallet which may be placed thereon.

The pattern arrangement of the assemblage of casters is preferably such as to leave the top surfaces of the tubular beams clear whereby they provide walkways.

Means are provided in the form of demountable rails, forming pallet stops, along the sides and across the ends of the structure, which stand up to an elevation above the plane of the tops of the inverted casters to maintain a pallet against lateral or forward and aft movement.

The forward end of the structure has a tow bar pivotly attached thereto while the rear end of the structure carries a pintle hook whereby the tow bar of a corresponding trailer can be attached to assemble two or more of the trailers as a train.

The foregoing and other objects of the invention will become apparent as the description of the same proceeds and the invention will be best understood from a consideration of the following detailed description taken in connection with the accompanying drawings wherein:

FIGURE 1 is a top view of a pallet trailer constructed in accordance with the present invention.

FIGURE 2 is a side view of the trailer of FIGURE 1.

FIGURE 3 is a rear view of the trailer of FIGURE 1.

FIGURE 4 is a longitudinal vertical section taken substantially on line 4—4 of FIGURE 3.

FIGURE 5 is a tranverse vertical section taken substantially on line 5—5 of FIGURE 4.

FIGURE 6 is a detailed view of a pallet-supporting caster of the trailer of FIGURE 1.

FIGURE 7 is a fragmentary transverse vertical section taken substantially on line 7—7 of FIGURE 2.

FIGURE 8 is an exploded perspective view illustrating a pallet stop detail of the trailer of FIGURE 1.

FIGURE 9 is a detailed perspective view of a pintle-hook portion of the rear of the trailer of FIGURE 1.

FIGURE 10 is a perspective view of a quick release coupling between the tow bar and frame of the trailer of FIGURE 1.

Referring now more particularly to the drawings, trailer 10 of the present invention includes a rigid frame 12 having front, rear and lateral sides respectively designated 14, 16, and 18, constructed of channel iron material as shown in several of the figures, with the channels directed inwardly.

The frame 12 also includes the transversely extending, spaced parallel tubular beams 20 which, in addition to being spaced apart in the longitudinal direction of the frame structure, are spaced inwardly from the front and rear ends thereof as shown in FIGURE 1.

Also comprising an integral part of the frame 12 are aligned tubular beam sections 22, 24, and 26 spaced inwardly from the lateral sides thereof. As shown in FIGURE 1 there are three of these tubular beam sections in alignment on opposite sides of the longitudinal center of the frame. The beam section 22 of each group is interposed between the forward cross beam 20 and frame front 14. The middle tubular beam section 24 of each group is interposed between the tubular cross beams 20, and the rear tubular beam section of each group in interposed between the rearwardly positioned cross beam 20 and rear 16 of the frame.

The tubular cross beams and the beam sections which extend longitudinally of the frame are of rectangular cross section as shown particularly in FIGURES 2, 3 and 4 and are open at their ends.

The open ends of the cross beams 20 and the open outer ends of the front and rear tubular beam sections provide receptors or entries for tines of fork-lift trucks.

As previously stated the front, rear, and lateral sides of the frame are constructed of channel iron material and such material is secured in sections between opposing ends of the truck tine receiving ends of the cross beams 20 and of the front and rear beam sections 22 and 26. For example, referring to FIGURE 2, it will be seen that the lateral side of the frame is formed of the three sections 28 of channel iron material and the illustrated ends of the tubular cross beams 20 are disposed between opposing ends of these sections to which they are welded or otherwise suitably secured. It will be understood that the opposite lateral side is likewise made up of three such angle iron sections between which the opposite ends of the beams 20 are secured.

The forwardly opening ends of the front tubular beam sections 22 are secured between opposing ends of similar channel iron sections designated 30 while the rearwardly opening ends of the rear tubular beam sections 26 are connected, as shown in FIGURE 3, between opposing ends of rear channel iron sections 32.

As shown in FIGURE 3, the rear side of the frame is made up of or includes four of the channel iron sections 32, the two innermost ones of such sections being in spaced relation as best shown in FIGURE 9 whereby there is provided a rearwardly opening recess 34 in which is mounted a pintle hook 36 in the manner hereinafter described.

As shown in the several views, the vertical dimension or width of the channel beam sections making up the frame 12 and the height of the transverse tubular beams 20 and the front to rear beam sections is the same wherefore the top and bottom surfaces of the frame and the top and bottom surfaces of the tubular beams and beam sections lie in a common plane.

The dolly structure is mounted upon or supported by four casters. Two of these casters are of the rigid type, as distinguished from pivoted ones and are designated 38 and are located at the rear of the frame while the front of the frame is supported by the two swivel casters designated 40. All of the supporting casters may be connected to the frame in any suitable manner. The particular manner of attaching these casters to the frame, as illustrated herein will be more specifically pointed out hereinafter.

The pallet supporting structure embodies a complex of omni-directional, line-contact, rolling members, such as swivel casters 42. These casters are supported in groups, in the manner about to be described, by and between the beams 20 and the beam sections 22, 24, and 26 and adjacent portions of the surrounding frame structure.

The inverted casters are mounted upon and detachably secured to bars 44 which, as shown in FIGURE 1, extend longitudinally of the frame. Certain of these bars are connected between the transverse tubular beams 20 as illustrated and parallel with the adjacent middle tubular beam sections 24 while others of the caster supporting bars are mounted between the transverse tubular beams 20 and the adjacent front and rear side channel beams of the frame, also in parallel relation with the adjacent front and rear beam sections 22 and 26.

The individual inverted casters 42 are mounted upon their respective supporting bars so as to be easily attachable to and detachable from the bars and consequently from the trailer structure as illustrated in FIGURE 6 where the numeral 46 generally designates the anti-friction or ball bearing connection between the supporting arms 48 for the roller 50 and the attaching plate 52, which plate is detachably connected to its supporting bar by the nut and bolt connection 54.

At the rear of the frame 12 a pair of bars 44 adjacent to each side of the frame, has secured thereon by welding or other suitable means, a caster plate 56, to the underside of which a rear caster 38 is secured or, such plate 56 may form an integral part of the caster structure.

At the front of the frame a pair of adjacent bars 44 at each side of the frame has the mounting plate 58 of a swivel caster 40 secured thereto by welding or in any other suitable manner.

Each of the plates 56 and 58 may have secured upon the top side thereof, an inverted caster 42, as shown, if desired.

It will be understood that the mounting for all of the inverted pallet supporting casters must be such as to place the tops or high sides of the caster rollers 50 in the same horizontal plane whereby a pallet resting upon the casters will be properly horizontally supported.

Set forwardly or inwardly in the recess 34 at the rear end of the frame is a short bar 60 secured between the adjacent longitudinal bars 44 as shown in FIGURE 9 and this short transverse bar 60 has the pintle hook 36 secured upon the rear side thereof in a suitable manner, as, for example, by means of the plate 62 which may be welded to the rear side of the bar 60. The bar 60 is sufficiently far forward to position the pintle hook entirely within the recess so that it will not project beyond the adjacent frame beam sections 32.

It will be seen upon reference to FIGURE 1 that the disposition of the groups of inverted casters 42 is such that the top surfaces of the transverse beams 20 and the beam sections 22, 24 and 26 remain unobstructed. These surfaces of the beams provide personnel walking surfaces or cross walks. Such surfaces are also preferably coated with a suitable non-skid material to form a high traction surface.

Extending around the perimeter of the trailer frame at the top thereof is an upstanding guard flange 64 having an inwardly and downwardly curved or rounded top edge or rim 66. This guard flange is rigidly connected to the frame and rises to approximately the height of the axes or centers of the inverted casters, as best seen in FIGURE 4, and functions to protect the inverted casters against damage by any object which might, without the presence of the guard flange, be slid onto the frame.

The numeral 68 designates a pallet stop which extends along each of the four sides of the frame. Each of the four pallet stops comprises an angle rail or bar 70 which has a length slightly less than the length of the side of the frame adjacent to which it is located.

Each pallet stop bar 70 carries a stake 72 which is adapted to be introduced into an upwardly opening socket 74 secured to the outer side of the frame. These stake sockets are here shown as consisting of a pair of short vertically disposed sections of angle bar 76 connected together by straps 78 disposed across the outer sides of the flanges of the bar sections, and a bottom strap 80 connecting the lower ends of the angle bar sections as shown in FIGURE 7 and upon which the inserted stake rests.

The stakes 72 of the pallet stops are of a height to maintain the angle bar rails 70 at an elevation above the tops of the inverted caster rollers whereby a pallet when resting upon the transfer section, which consists of the individual inverted casters 42, will be prevented from shifting or sliding off of the trailer.

While a particular construction of stake socket has been illustrated and described obviously any other suitable socket forming means may be employed for receiving the stakes 72.

The open spaces between the tubular beams and the beam sections and the adjacent sides of the frame are covered by a metal screen 81. This screen preferably is in the form of the well known expanded metal material, commonly employed for screening and other purposes.

The forward end of the dolly structure has attached to the frame 12 the tow bar which is generally designated 82. This bar is here shown as comprising the two legs 84 arranged in the form of a V and having the convergent ends joined to and coupled together by a ring 86 which may be positioned horizontally to engage over a pintle hook, such as the pintle hook 36, of another dolly structure.

The divergent ends of the legs 84 of the tow bar are connected to plates 88. The rear ends of these plates 88 are adapted to be inserted between bracket plates 90 fixed to the forward side of a channel bar section 30 and pivotally joined to the plates by an easily withdrawn coupling pin 92 extending through aligned apertures in the bracket plates and in the intervening plate 88.

A chain 94 couples each of the pins 92 to the adjacent frame as illustrated in FIGURE 10.

Each of the corners of the dolly frame is protected by a rubber wrap around bumper 96 and suitable bumpers are secured to the lateral sides of the frame structure as indicated at 98 and which are also of rubber or other suitable resilient material.

The numeral 100 designates light reflecting means secured to the lateral sides of the frame. Such means may be in the form of a fluorescent material or any other light producing or reflecting means which will show up clearly at night upon receiving rays from a light source.

As hereinbefore stated, the pallet trailer of the present invention is designed to support and transport loaded pallets carrying weights ranging anywhere from 10,000 to 25,000 pounds. Accordingly, such a structure must be well designed to withstand strains imposed thereon by such weights and the novel interconnection between the tubular beams and tubular beam sections and the channel iron frame sections provides maximum strength and resistance to torsional and other strains.

For supporting large and heavy loads having weights as herein set forth it will be apparent that the trailer must not only be of heavy and strong construction but must have substantial size and as an illustration and without intending to limit the invention in any respect it is set forth that the trailer may have a width of approximately 90 inches and a length of approximately 110 inches and stand approximately 16½ inches high.

The supporting casters 38 and 40 are of a design to facilitate moving and towing the dolly over wet or dry paved areas at a satisfactory speed such, for example, as 5 miles per hour and such casters must also be capable of supporting a rated load of as much as 3,000 pounds at such speed.

The dolly is constructed to receive lift truck forks on any one of its four sides. Such fork receiving means are provided by the open ends of the transverse tubular beams or the beam sections 22 at the front and 26 at the rear. Such open ends of the tubular beams are provided in pairs as shown in FIGURES 2 to 4, for example, and provide entry openings approximately 4 by 12 inches in size and when the fork lift tines are completely inserted into the receptors and fully engaged with the trailer, such lift entries will prevent tilting and oscillation of the trailer during its movement by the lift.

The fork lift entries or receptors at the four sides of the trailer structure are preferably spaced apart a maximum of 60 inches whereby the efficient handling of off center loads is accomplished.

The pallet stops or restraints 68 are readily removable from the trailer frame or attached thereto, whereby pallets may be easily and quickly placed upon the transfer section of the dolly and when such stops or restraints are mounted in position they will effectively prevent a pallet from sliding off of the dolly while it is being moved.

It will be readily apparent from the foregoing that a pallet, either loaded or unloaded, when in position upon the transfer section, can be easily and quickly moved forward, backward, to the right or to the left or completely rotated with a minimum of effort.

A particularly advantageous feature of the present trailer structure resides in the maximum ground clearance and mobility obtained as a result of the integration of the tine receptors or entry ways into the main frame structure whereby there is obtained a structure of minimum depth. By this means there is achieved an average ground clearance of approximately 10 inches under the complete trailer in a trailer having an overall height of 18 inches to the top of the inverted caster complex. Such increased and advantageous ground clearance results in a greater degree of mobility and provides the ability to negotiate uneven, snow clogged or sandy terrain and to negotiate any ordinary access ramps.

From the foregoing it will be seen that there is provided by the present invention a novel pallet trailer having many features of advantage over other trailer structures.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A pallet trailer comprising a generally planar frame having front, rear, and lateral sides and comprising open end tubular members, certain of said members forming long beams extending fully across said frame between two opposite sides thereof and certain other of said tubular members forming short beams sections extending perpendicularly to said long beams, said short beams sections being coplanar with said long beams and being rigidly connected therewith in open-communication intersections to form open ended passageways transverse to said long beams and extending between the other opposite sides of the trailer, said open end beams and beam sections forming entries for tines for a fork-lift truck, said beams and beam sections forming open areas within the perimeter of said frame, support means secured to said frame to extend across said open areas, a multiplicity of inverted swivel casters mounted on said support means and forming a pallet support surface, ground engaging wheels secured to said support means, and draft means coupled to the front side of said frame.

2. A pallet trailer comprising: a generally planar body having front, rear, and lateral sides, said body having elongated, open-ended, tine-receiving means, certain of said tine-receiving means forming long beams extending across said body between two opposite sides thereof and certain other of said tine-receiving means forming short beams sections extending perpendicularly to said long beams, said short beams sections being substantially coplanar with said long beams and being joined thereto in open-communication intersections to form two sets of mutually perpendicular open-ended tine passageways extending across the trailer, said beams and beam sections defining areas within the perimeter of the trailer, said body including support means extending across said areas; a multiplicity of inverted swivel casters mounted on said support means and forming a pallet-supporting surface; ground-engaging wheels secured to said body; and draft means connected to the front side of said trailer body.

3. An omni-directional-transfer trailer adapted for transferring and transporting palletized loads on the ground and for being elevated by fork-lift type vehicles to raised pallet-transfer positions and for omni-directional transfer of loads on to or off of the trailer at such elevated positions, comprising: a generally planar trailer frame including members extending across said trailer having open-ended tubular configurations whereby the tines of a fork-lift type vehicle can be received in said members; said frame further including support means rigidly connected to said members and having a plurality of horizontal support surfaces generally coplanar with the top of said tubularly-configured members; a plurality of ground-engaging wheels mounted upon portions of said support surfaces; and omni-directional, pallet-supporting wheels mounted upon other portions of said support surfaces.

4. A pallet-transfer trailer for transporting pallets over the ground and adapted to be elevated by tine-lift type vehicles to raised positions for omni-directional pallet transfer to or from an elevated pallet supporting surface, comprising: a frame including as primary structural members perpendicularly related sets of open-ended tubular beam means disposed in one plane, the beam means of one set intersecting the beam means of the other set in open communications to adapt said frame for insertion of lifting tines from two perpendicularly-related directions; supporting wheels connected to said frame to maintain it in parallel spaced relation above a surface; and line-contact pallet support means mounted on the top of said frame and constructed to permit a pallet supported thereon to be readily moved at least in directions parallel to either set of tubular beam means whereby pallet transfer can be accomplished at the elevated positions with the lifting tines inserted in either set of tubular beam means.

5. A trailer as defined in claim 4: said intersecting sets of beam means defining a plurality of areas therebetween, said frame including mounting means extending across said areas, said wheels and at least a portion of said line-contact pallet support means being respectively secured to said mounting means.

6. A trailer as defined in claim 5: said tubular beam means having relatively wide flat top surfaces and being unobstructed by any pallet support means to thereby constitute walkways extending across the trailer.

7. A trailer as defined in claim 4: said line-contact pallet support means and at least a portion of said supporting wheels being swivel casters, incorporating horizontally oriented mounting surfaces, the mounting surfaces of the pallet-supporting casters and of the trailer-supporting casters being connected to said trailer frame at substantially the same horizontal plane whereby the overall height of said trailer is minimized.

References Cited by the Examiner
UNITED STATES PATENTS

| | | | |
|---|---|---|---|
| Re. 24,319 | 5/1957 | McLaughlin | 193—35 |
| 1,563,863 | 12/1925 | Joyner | 214—84 |
| 2,664,219 | 12/1953 | Schmidt | 220—1.5 |
| 2,813,642 | 11/1957 | Fisher | 214—84 |
| 2,827,302 | 3/1958 | Skyrud | 280—79.1 X |

HUGO O. SCHULZ, *Primary Examiner.*